United States Patent
Seppänen

(10) Patent No.: US 10,511,714 B2
(45) Date of Patent: Dec. 17, 2019

(54) PROVISION OF CONTENT DATA TO CALLEE

(71) Applicant: Telia Company AB, Solna (SE)

(72) Inventor: Juho Seppänen, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/906,188

(22) Filed: Feb. 27, 2018

(65) Prior Publication Data

US 2018/0249003 A1 Aug. 30, 2018

(30) Foreign Application Priority Data

Feb. 27, 2017 (FI) ...................................... 20175184

(51) Int. Cl.
| | |
|---|---|
| H04M 3/42 | (2006.01) |
| H04L 29/06 | (2006.01) |
| H04W 76/10 | (2018.01) |
| H04W 4/16 | (2009.01) |

(52) U.S. Cl.
CPC .... *H04M 3/42374* (2013.01); *H04L 65/1016* (2013.01); *H04L 65/1069* (2013.01); *H04W 4/16* (2013.01); *H04W 76/10* (2018.02); *H04L 65/1006* (2013.01); *H04M 3/42042* (2013.01); *H04M 2207/18* (2013.01)

(58) Field of Classification Search
CPC combination set(s) only.
See application file for complete search history.

(56) References Cited

U.S. PATENT DOCUMENTS

| 9,065,970 | B2 | 6/2015 | Martinez et al. |
| 2013/0339520 | A1* | 12/2013 | Jang ........................ H04L 43/10 709/224 |
| 2014/0057667 | A1 | 2/2014 | Blankenship et al. |
| 2014/0226657 | A1 | 8/2014 | Bouvet |
| 2014/0324952 | A1* | 10/2014 | Irwin .................. H04L 65/1016 709/203 |
| 2014/0372557 | A1* | 12/2014 | Buckley ................ H04L 67/104 709/217 |

(Continued)

FOREIGN PATENT DOCUMENTS

| EP | 2493166 | 8/2012 |
| GB | 2 488 120 A | 8/2012 |

OTHER PUBLICATIONS

European Search Report for Application No. 18157793, dated May 4, 2018.

(Continued)

*Primary Examiner* — Hicham B Foud
(74) *Attorney, Agent, or Firm* — Young & Thompson

(57) ABSTRACT

A solution according to the invention relates to a method for determining a communication channel for providing content data in a context of call setup from a subscriber A to a subscriber B. In the method a capability of the subscriber B to support a specific communication framework is determined and in response to a detection that the subscriber B supports the predetermined communication framework triggering a transmission of the content data over the specific communication framework. Otherwise, the content data is transmitted to the subscriber B over a communication network into which the subscriber B is connected to. The invention also relates to a user equipment, a computer program product and a system.

14 Claims, 3 Drawing Sheets

(56) References Cited

U.S. PATENT DOCUMENTS

| | | | |
|---|---|---|---|
| 2015/0127842 A1* | 5/2015 | Lindsay | H04L 65/1073 709/228 |
| 2015/0223045 A1 | 8/2015 | Sandblad | |
| 2015/0281998 A1 | 10/2015 | Joly et al. | |
| 2016/0219093 A1* | 7/2016 | Gangadharan | H04L 65/1006 |
| 2017/0374504 A1* | 12/2017 | Synal | H04W 4/021 |

OTHER PUBLICATIONS

FI Search Report, dated Aug. 17, 2017, from corresponding FI 20175184 application.

* cited by examiner

PROVISION OF CONTENT DATA TO CALLEE

TECHNICAL FIELD

The invention concerns in general the technical field of telecommunications. Especially the invention concerns a transmission of content data between subscribers in a telecommunication network in a context of call setup.

BACKGROUND OF THE INVENTION

When a callee (subscriber B) receives a call from a caller (subscriber A) it is advantageous if the callee receives information on the caller for example in order to decide if he/she accepts the call. In mobile communication this kind of situation is traditionally achieved by utilizing the phone book in the user equipment. The user pre-stores contact details, such as MSISDN number with names, in a memory of the user device or subscriber identity module, and when the user i.e. the callee receives the call from a subscriber A, the user equipment is configured to retrieve caller details from the phone book on a basis of MSISDN number delivered in the call and as a result the callee (subscriber B) may see on the display of the user equipment the caller name. This works fine as long as the callee has pre-stored the information on the caller in the memory. However, when the caller is unknown to the callee the phone book based solution does not work.

Another known solution to achieve the same outcome is such that when the subscriber B receives the call the user equipment is configured to initiate a query towards a network element in order to retrieve information, such as a name, of a subscriber A. This kind of arrangement, at least in principle, solves the above described problem and by means of the arrangement it is also possible to provide information on unknown callers to the callee. However, the problem is that the arrangement requires that an application is installed in the user equipment, which is configured to perform the query to the network node. The challenge may also be when the network coverage is limited during the incoming call. Then it may happen that the retrieval of information on subscriber A takes too long while the call is already ringing and as a result the desired information cannot be provided to the callee. Further challenge with the existing solutions is that the user equipment may restrict giving the MSISDN of the caller to the installed application, thus the application not being able to identify the caller MSISDN to perform a query on the network node, e.g. to retrieve the caller name.

According to still further prior art solution it is possible to establish a specific communication environment by means of which enhanced services, such as phonebook, messaging and call services, may be offered. Such an environment is so called Rich Communication Service (RCS) environment in which inter-operator services based on IP Multimedia Subsystem (IMS) may be offered. The RCS environment also provides a mechanism for providing information in the context of a call, which mechanism is called as a call composer procedure. However, the problem with the RCS based solution is that it requires that both parties support the RCS environment. Otherwise the provision of information is not possible.

Thus, there is need to develop improved solutions in order to enable a provision of information from the caller to callee in a context of a call.

SUMMARY OF THE INVENTION

An objective of the invention is to present a method, a user equipment, a computer program product and a system for determining a communication channel for providing content data to a recipient. Another objective of the invention is that the method, the user equipment, the computer program product and the system for determining a communication channel for providing content data to a recipient may be utilized in a context of call setup.

The objectives of the invention are reached by a method, a user equipment, a computer program product and a system as defined by the respective independent claims.

According to a first aspect, a method for determining a communication channel for providing content data in a context of call setup from a subscriber A to a subscriber B is provided, the method comprising: generating an inquiry with a communication application, the inquiry comprising an indicator for determining a capability of the subscriber B to support a specific communication framework; receiving a response to the inquiry, the response comprising an indication on the capability of the subscriber B to support the specific communication framework; in response to a detection that the subscriber B supports the predetermined communication framework triggering a transmission of the content data over the specific communication framework; and in response to a detection that the subscriber B does not support the specific communication framework triggering a transmission of the content data to the subscriber B over a communication network into which the subscriber B is connected to.

The specific communication framework may be a Rich Communication Service, RCS, framework.

The determination of the capability of the subscriber B may be performed with a capability discovery procedure over RCS network infrastructure.

In response to a detection that the subscriber B does not support the specific communication framework a signal may be generated for transmitting the content data to a connection control unit serving the subscriber A, wherein an indication on a server implementing content data provision service is associated to the content data. The signal may further comprise a contact address of the subscriber B.

Moreover, the call setup may be initiated in response to a receipt of an acknowledgement indicating a successful transmission of the content data to the subscriber B.

According to a second aspect, a user equipment of a subscriber A for determining a communication channel for providing content data in a context of call setup to a user equipment of a subscriber B is provided, the user equipment of the subscriber A comprising: at least one processor; at least one memory including computer program code; the at least one memory and the computer program code configured to, with the at least one processor, cause the user equipment of the subscriber A to perform: generate an inquiry with a communication application, the inquiry comprising an indicator for determining a capability of the subscriber B to support a specific communication framework; receive a response to the inquiry, the response comprising an indication on the capability of the subscriber B to support the specific communication framework; trigger, in response to a detection that the subscriber B supports the predetermined communication framework, a transmission of the content data over the specific communication framework; and trigger, in response to a detection that the subscriber B does not support the specific communication framework, a transmission of the content data to the subscriber B over a communication network into which the subscriber B is connected to.

The user equipment may be configured to utilize a Rich Communication Service, RCS, framework as the specific communication framework.

The user equipment may be configured to determine the capability of the subscriber B with a capability discovery procedure over RCS network infrastructure.

The user equipment of the subscriber A may be configured to generate a signal for transmitting the content data to a connection control unit serving the subscriber A in response to a detection that the subscriber B does not support the specific communication framework, wherein an indication on a server implementing content data provision service is associated to the content data. The user equipment may be configured to add a contact address of the subscriber B in the signal.

Moreover, the user equipment may be configured to initiate a call setup in response to a receipt of an acknowledgement indicating a successful transmission of the content data to the subscriber B.

According to a third aspect, a computer program product is provided, the computer program product comprising at least one computer-readable storage medium having computer-executable program code instructions stored therein for performing the method as described above when the computer program product is executed on a user equipment.

According to a fourth aspect, a system for determining a communication channel for providing content data in a context of call setup is provided, the system comprising: a user equipment of a subscriber A, a user equipment of a subscriber B, a server, at least one communication network for communicatively coupling the server to the user equipment of the subscriber A and for communicatively coupling the server to the user equipment of the subscriber B, an infrastructure for a specific communication framework, wherein the system the user equipment of the subscriber A is configured to perform: generate an inquiry with a communication application to the infrastructure for the specific communication framework, the inquiry comprising an indicator for determining a capability of the subscriber B to support a specific communication framework; receive a response to the inquiry from the infrastructure, the response comprising an indication on the capability of the subscriber B to support the specific communication framework; trigger, in response to a detection that the subscriber B supports the predetermined communication framework, a transmission of the content data over the infrastructure of the specific communication framework; and trigger, in response to a detection that the subscriber B does not support the specific communication framework, a transmission of the content data to the subscriber B via the server over the communication network into which the subscriber B is connected to.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

FIG. 1 illustrates schematically an environment in which the present invention may be applied to.

DESCRIPTION OF SOME EMBODIMENTS

In the following the present invention is described. In the description a caller is referred with a term subscriber A and a callee is referred with subscriber B, both equipped with user equipment. The subscriber is defined in the network by a predetermined data entity identifying the subscriber in the network and to whom the network may provide the network services in use. Both the caller and the callee use any equipment by means of which it is possible to utilize the network services, such as establishing a connection through a mobile communication network. In order to have an access to the mobile communication network the user equipment (UE) are equipped with a subscriber identity module (SIM) storing the subscriber identity and authentication related information to be utilized in the communication through the mobile communication network. The subscriber identity module may be provided physically with UICC (Universal Integrated Circuit Card) in the user equipment or at least partly with a software solution implemented in the user equipment. Additionally, the user equipments, and the subscriptions, of the callees may or may not support specific service frameworks, such as Rich Communication Service (RCS) framework.

Figure 1:
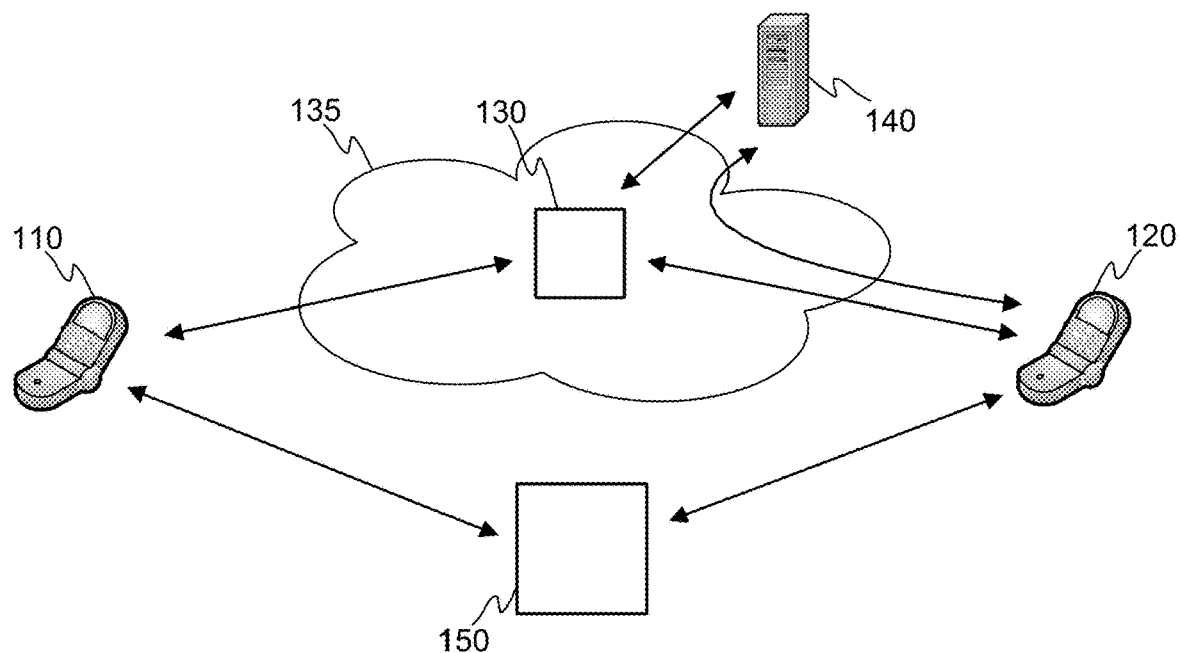

Some aspects relating to the present invention is now described by referring to FIG. 1. FIG. 1 illustrates schematically an environment of the invention wherein at least some of the relevant entities from the invention point of view are depicted. Subscriber A 110 intends to reach subscriber B 120 with a call connection. According to some embodiment of the invention a specific communication application is installed and executed in the user equipment of at least the subscriber A 110 and possibly in the user equipment of the subscriber B 120. In other words, the subscriber A 110 may initiate a communication application by means of which it is at least possible to establish a call connection to the subscriber B 120 through a connection control unit 130 residing in a mobile communication network 135. The initiation of the application may cause the user equipment of the subscriber A 110 to prompt the user to input an indication for selecting a recipient, i.e. the subscriber B 120, and to input a message to the subscriber B 120. The message is intended to be delivered to the subscriber B 120 prior to call establishment. The input message may e.g. relate to the call, e.g. represent the subject on which the subscriber A 110 is willing to talk during the call or any other information the subscriber A 110 is willing to deliver to the subscriber B 120 before the call connection is established. The prompting may be performed e.g. by displaying a text box on the display of the user equipment of the subscriber A 110 into which the user is prompted to write an indication on the recipient and to write a message e.g. through a keyboard displayed on a touch screen of the user equipment. The input mechanism is not limited to the one described above. Further, the message format is not limited to text, but may also cover image format, audio format or video format among others.

Figure 2:
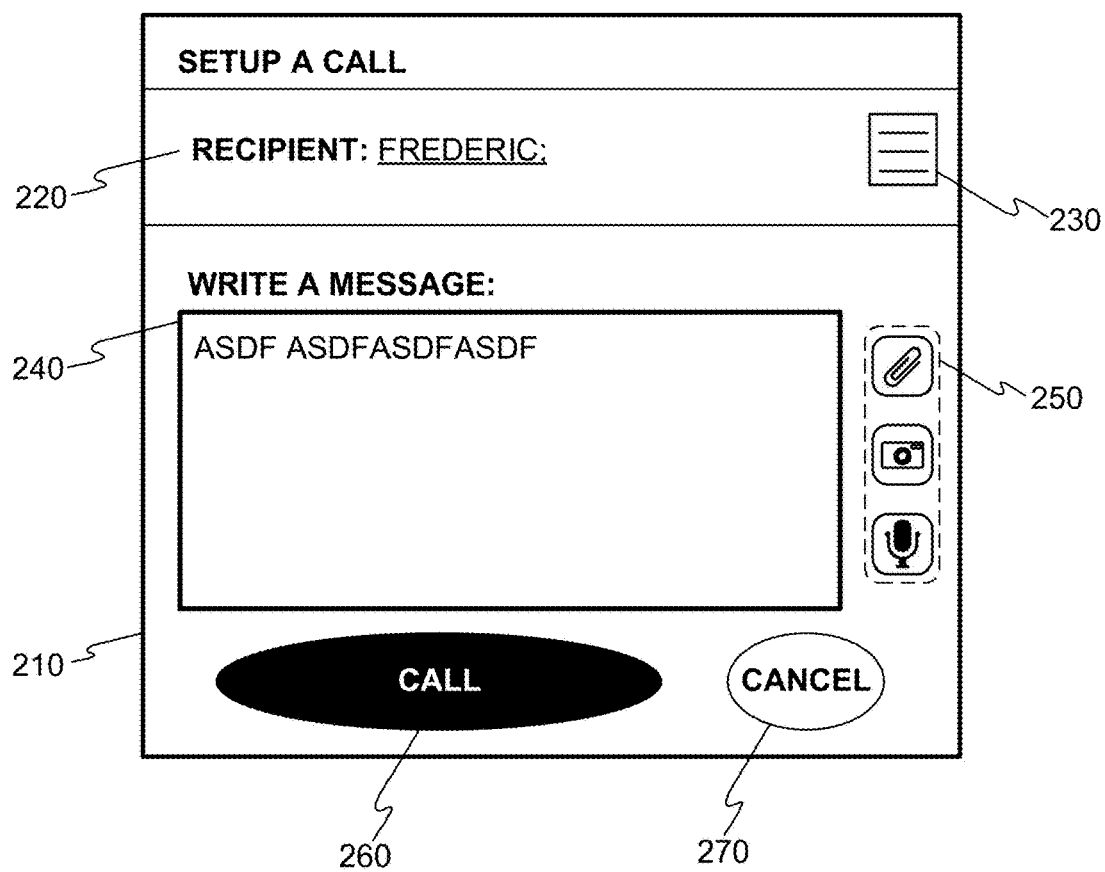
FIG. 2 illustrates schematically an example of a user interface of application according to an embodiment of the invention.

FIG. 2 illustrates schematically an example of a user interface 210 generated by the application through which the call, and other functions relating to at least some embodiments of the invention, may be initiated in the user equipment in response to a receipt of an indication that the subscriber A is willing to initiate a call establishment. The user interface 210 may comprise a recipient field 220 into which the user of the user equipment inputs contact detail(s) of one or more recipients to which he/she is willing to setup the call. The user interface 210 may also comprise an icon 230 for a phone book by means of which the user may access his/her phone book and select the one or more recipients stored therein. Naturally, it is possible to input the contact detail, such as a phone number, with a keyboard. Moreover, the user interface may comprise a field 240 into which a user may be prompted to write a message to be delivered to the recipient in the context of call setup. The user interface 210 may also comprise icons 250 by means of which it is possible to generate a message in another format, such as in audio, as an image or in video format. It may also be possible to attach a file in the message. In other words, the selection of an icon may initiate a corresponding tool, such as a microphone or camera, for example. The user interface 210 may also comprise icons for initiating the call 260 or for canceling the call setup 270. The user interface as depicted in FIG. 2 is an example for the purpose of describing the inventive idea of the present invention.

Now, there is need to select a path through which the content data, i.e. the data the subscriber A 110 input in the application, is to be delivered to the recipient i.e. the subscriber B 120. The selection of the path is, at least in part, dependent on a capability of the subscriber B, i.e. the user equipment of the subscriber B. Namely, one aspect of the present invention is to determine a path through which the content data may be delivered to the subscriber B 120. Primarily, in some implementation, the content data is to be delivered over a specific communication framework to the subscriber B 120 and, thus, there is need to determine if the subscriber B supports the specific communication framework in question. The specific communication framework refers to the RCS herein. Hence, for selecting the path the subscriber A 110 may be configured to initiate, in response to a specific operation, so called capability discovery of the subscriber B 120. This kind of capability discovery may be performed through a Rich Communication Service (RCS) infrastructure referred with 150 in FIG. 1 which infrastructure may be configured to utilize communication services of the mobile communication network 135 e.g. for signaling, among other purposes. The RCS infrastructure 150 refers to a function implementation in one or a plurality of network elements by means of which the RCS may be implemented to. The RCS infrastructure 150 may comprise a RCS messaging server and message storage element among other possible elements. During the capability discovery it may be determined if the subscriber B 120 supports the specific communication framework, and especially so called call composer service therein, by means of which it is possible to share data between two parties over so called enriched calling session. In other words, the application by means of which the subscriber A 110 is initiating the content data creation may be configured to determine prior to a call setup, by generating a capability determination inquiry towards the subscriber B 120 over a network, if the subscriber B supports the specific communication framework or not. The inquiry is delivered to the RCS infrastructure 150. According to an embodiment of the invention, a RCS messaging server being a part of the RCS infrastructure may be configured to identify from a predetermined identifier that the inquiry relates to the capability determination. In response to the identification the RCS messaging server may be configured to forward it to the subscriber B 120. Naturally, the inquiry may carry information, such as contact address, on the subscriber B. The subscriber B 120 may be configured to respond to inquiry by providing capability information, such as by indicating its support to the call composer service, i.e. support of the specific communication framework, with a signaling towards the RCS infrastructure 150, which forwards the information either directly or by performing at least some predetermined operations to the response to the subscriber A 110 and more specifically to the specific communication application executed in the user equipment of subscriber A 110. Generally speaking the instant of time when the capability discovery is performed may vary according to the inventive idea. In some implementation it may be initiated in response to a predetermined action, such as in response to a selection, or input, of a recipient. Alternatively or in addition, the application may be configured to perform the capability discovery automatically to all possible recipients whose contact details are stored in a contact book of the user equipment. These are non-limiting examples relating to the mentioned aspect of the present invention.

In response to a receipt of information to the capability discovery inquiry the subscriber A 110 may be configured to determine if the content data is deliverable over the specific communication framework, such as RCS, or not to the subscriber B 120. The determination may be performed with a predetermined operation executed e.g. by the communication application operating in user equipment of the subscriber A 110. The communication application may e.g. be configured to determine from the information received from the RCS infrastructure 150 if the subscriber B 120 supports the specific communication framework or not and specifically the call composer service therein. The determination may indicate that the subscriber B 120, i.e. the user equipment with necessary applications, supports the specific communication framework and in that case the communication application residing in the user equipment of the subscriber A may be configured to initiate a transmission of the content data in response to a predetermined triggering event, such as in response to user action through the user interface of the user equipment. For example, the user may indicate manually through a user interface that he/she is willing to initiate the call setup. In response to the indication the communication application may be configured to initiate the transmission of the content data through the specific communication framework, i.e. RCS infrastructure. The communication framework may be configured to acknowledge to the communication application that the content data is delivered to the subscriber B 120 which may cause the communication application to initiate a call setup to subscriber B 120 through a dedicated communication channel. Alternatively, the communication application may be configured to operate so that it initiates the transmission of the content data to the subscriber B 120 and at the same time initiates a timer for triggering the call setup when the timer runs out. The timer value may advantageously be set so that the content data has reached the subscriber B 120 with sufficient probability. The probability value may be determined on the basis of measurements representing the delivery time of the content data to the recipient in a typical network conditions, for example. Alternatively or in addition, the value for the timer may e.g. be delivered from the server 140 especially in a situation in which the subscriber B 120 does not support the specific communication framework, such as RCS. As a result, the communication application may delay the initiation of the call setup until the timer has lapsed. The call setup may e.g. be arranged through a dedicated communication channel over the mobile communication network 135. The triggering event causing the communication application to initiate the content data transmission and the call setup as described above in an exemplary manner is not limited to ones described above.

Further, if the determination from the information received in response to the capability discovery inquiry indicates that the subscriber B 120 does not support the specific communication framework, e.g. it cannot receive the content data over RCS infrastructure 150, the communication application residing in the user terminal of the subscriber A 110 may be configured to generate a signaling e.g. to a mobile communication network 135, or to any other communication network serving the subscriber A, either directly or indirectly, which signal is configured at least to carry the content data the subscriber A 110 is willing to transmit to the subscriber B 120 prior to call setup. The connection control unit 130, such as MSC or MSS, may be configured to receive the signal and to determine from the signal that the content data carried in the signal relates to a service implemented by a server 140. In some embodiment of the invention the communication between the subscriber A 110 and the server 140 is not necessarily routed through the connection control unit 130, but it may be arranged through some other type of network node. This may be the case if both the subscriber B 110 and the server 140 reside in the same local area network, such as WLAN for example. The implementation of the service may also be decentralized i.e. a plurality of servers 140 are configured to implement specific functions which servers together implement the service as a whole. Additionally, the signal may carry contact address, such as a network address or similar, on the subscriber B 120. Now, the signal, or at least some information obtained from the signal, may be transmitted to the server 140 implementing the service. The server 140 may be configured to recognize, based on the information received in the signal, that the content data is intended to the subscriber B 120. Possibly, the information may comprise an indicator indicating that the subscriber B 120 does not support the receipt of data over RCS infrastructure 150, or any other indicator which indicates that the content data relates to the service implemented by the server 140 and shall be transmitted to the subscriber B 120. When such recognition is made the server 140 may be configured to obtain the content data from the signal and to generate a message in such a message format that it may be received and output in the user equipment of the subscriber B 120. The message format may be internally defined in a memory accessible by the server 140 or it may be derived from the signaling received originally from the subscriber A 110. Advantageously the message format is such that it may be received and output in the user equipment of the subscriber B 120 with a high probability, or even for sure. Some non-limiting examples of an applicable delivery channels and formats for the message are USSD (Unstructured Supplementary Service Data), SIM OTA (SIM Over-the-Air) and a short message (SMS). It may also be delivered over IP using some other (than RCS) service the 110 at least supports, to which 140 also belongs to. Advantageously, the message format may be such that it outputs the content directly on the display of the user equipment of the subscriber B 120, such as flash SMS (class 0) if the short message is used as the message type. Generally speaking the message format is advantageously based on, but is not limited to, a telecommunication standard according to which the communication network into which the subscriber B 120 is registered to is configured to operate which increases the probability that the recipient, i.e. the subscriber B 120, is capable of receiving the message. As mentioned, the server 140 may also be configured to, in addition to the obtain of the content data, to obtain the contact address of the subscriber B 120, such as the MSISDN number, from the signal and insert the destination address to the message when generating the message, and finally transmit the message in the predetermined format to the subscriber B 120 e.g. through the mobile communication network 135. According to an embodiment of the invention the subscriber B 120 may acknowledge the receipt of the content data to the server 140, which further acknowledges a successful transmission of the content data to the subscriber B through the mobile communication network 135 to the communication application of the subscriber A 110. The acknowledgement may cause the communication application to initiate the setup of the call through a dedicated communication channel, i.e. e.g. over the mobile communication network 135. In case the implementation of the present invention is not based on acknowledging the successful delivery of the content data to the subscriber B 120, as described above, the communication application may be configured to initiate a call setup according to predetermined rules defined in the communication application. For example, the communication application may initiate a timer when the content data is signaled to the server 140 through the mobile communication network. The call setup may be triggered when the timer runs out. The timer value may advantageously be set so that the content data has reached the subscriber B 120 with sufficient probability. The probability value may be determined on the basis of measurements representing the delivery time of the content data to the recipient in a typical network conditions, for example. Alternatively or in addition, the value for the timer may e.g. be delivered to the communication application from a network node, such as the connection control unit 130, monitoring an operation of the mobile communication network 135. This enables adjustment of the timer value according to a performance of the mobile communication network 135 at the time of the call setup. Alternatively or in addition, the server 140 may be configured to monitor the operation of the service and provide the timer value, or at least give some input for the determination of the timer value. As a result, the communication application may delay the initiation of the call setup until the timer has lapsed. The call setup may e.g. be arranged through the dedicated communication channel over the mobile communication network 135. The triggering event causing the communication application to initiate the content data transmission and the call setup as described above in an exemplary manner.

The non-limiting example of the present inventive idea as shown in FIG. 1 and described above hints that the communication between the subscriber A and the server 140, and between the server 140 and the subscriber B 120 is arranged over the mobile communication network 135. However, the utilization of the mobile communication network 135 is only a non-limiting example of the communication channel between the mentioned identities, and the communication as described above may be arranged through any other communication channel. For example, the server and at least one of the subscribers 110, 120 may reside in the same Wi-Fi network and the mentioned entities are equipped with an applicable hardware and software for communicating over the Wi-Fi network. Hence, it is possible to arrange that the communication according to the invention is arranged over the Wi-Fi network. In this kind of implementation the message format may be adjusted to such that it may be transmitted over a used protocol, such as TCP/IP protocol. Moreover, there may be a plurality of networks implanting the same or different network technology between the mentioned entities through which the messaging according to the present invention may be transmitted. If necessary, there may be arranged interworking units between the networks for transmitting the message to the destination.

According to another implementation of the present invention it may be arranged that the server 140, or any corresponding network node, may be configured to store information on a capability of at least some subscribers to support a still further communication framework. In such an implementation the communication application, by means of which the user is preparing the content to be transmitted, may be configured to inquiry the information on the capability of the subscriber B 120 to support the still further communication framework. For example, the communication application may be arranged to store a network address of the server 140, or the network node, into which it is configured to transmit the inquiry over a communication channel with an indication of the subscriber B 120, whose capability is inquired. The server 140 may advantageously be configured to return an indicator representing the capability of the subscriber B 120 and to return it to the communication application run in the subscriber A 110. If the indicator represents that the subscriber B 120 supports the still further communication framework, the communication application may be configured to initiate the transmission of the content data through the still further communication framework. The initiation may require a setup of a session over the still further communication framework to the subscriber B 120 and the content data may then be transmitted. The initiation may be triggered according to the mechanisms as already described. If this kind of implementation is established the process may be arranged so that the subscriber A 110 first initiates the capability discovery relating to the specific communication framework to the RCS infrastructure 150 and if it returns a negative response with respect to subscriber B's 120 capability to support the RCS communication the communication application may be configured to initiate the inquiry towards the server 140. In the inquiry it is requested if the server 140 stores information on further communication frameworks supported by the subscriber B 120. In some implementation of this kind of embodiment the communication application may be configured to include at least one further communication framework it supports in the inquiry. In case no such further communication framework being mutual for both the subscriber A 110 and the subscriber B is found, the content data may be signaled over a standardized mechanism, such as with SMS, USSD or similar from the server 140 to the subscriber B 120.

Figure 3:
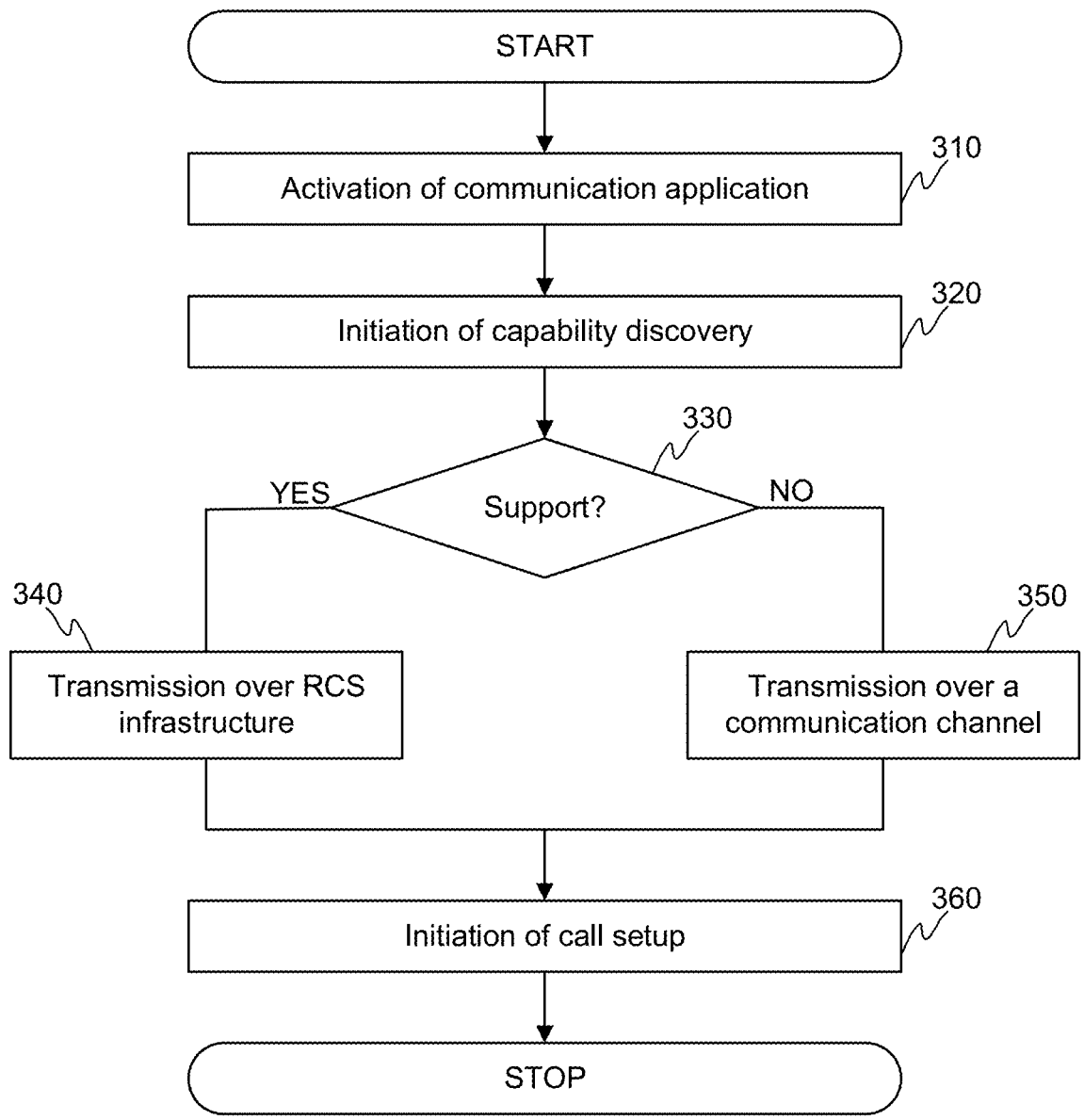
FIG. 3 illustrates schematically an example of a method according to an embodiment of the invention.

FIG. 3 schematically illustrates an example of a method according to an embodiment of the present invention. According to the embodiment a communication application residing in the user equipment of the subscriber A 110 is activated 310 and the user intends to initiate a call. The user may select at least one recipient of the call, i.e. the subscriber B 120 e.g. from the phone book or to input destination address, such as MSISDN, for the recipient. Moreover, the subscriber A 110 intends to deliver content data e.g. prior to the call setup to the subscriber B 120. In response to a predetermined action the subscriber A 110 initiates a capability discovery 320 in order to find out at least in part a capability of the subscriber B 120, i.e. the user equipment and the subscription. For sake of clarity the capability discovery may also be performed at some other instant as described, e.g. immediately when selecting the recipient. Further, the communication application executed in the user equipment of the subscriber A 110 may receive information on the capability of the subscriber B 120 and based on that to determine if the subscriber B 120 supports a specific communication framework or not. The specific communication framework may refer to RCS. In case the information indicates that the subscriber B 120 supports the specific communication framework the content data may be transmitted to the subscriber B 120 over the specific communication framework 340. On the other hand, if the information indicates that the subscriber B 120 does not support the specific communication framework, the communication application executed in the user equipment of the subscriber A 110 may be configured to initiate a transmission of the content data 350 to the subscriber B 120 over a communication network, such as a mobile communication network 135 or Wi-Fi or similar into which the subscriber B (120) is connected to. The transmission may also require processing of the content data into a form by means of which it may be transmitted over a communication protocol implemented by the mobile communication network. Moreover, the processing may comprise a step in which an indication of the service, or the server implementing the service, is included in the message as well as a destination address of the subscriber B 120. At some point the communication application may initiate a call setup 360 to the subscriber B 120 in a known manner. The trigger for the initiation of the call setup 360 may vary, but may be based on active operation e.g. by the user or an automatic operation based e.g. on a timer or any similar. Finally, the call is set up and the subscriber A 110 and subscriber B 120 may have a conversation with each other. In the alternative solution the subscriber A 110 may be capable of delivering content data to the subscriber B 120 after call is established if subscriber B is not supporting the specific communication framework.

Figure 4:
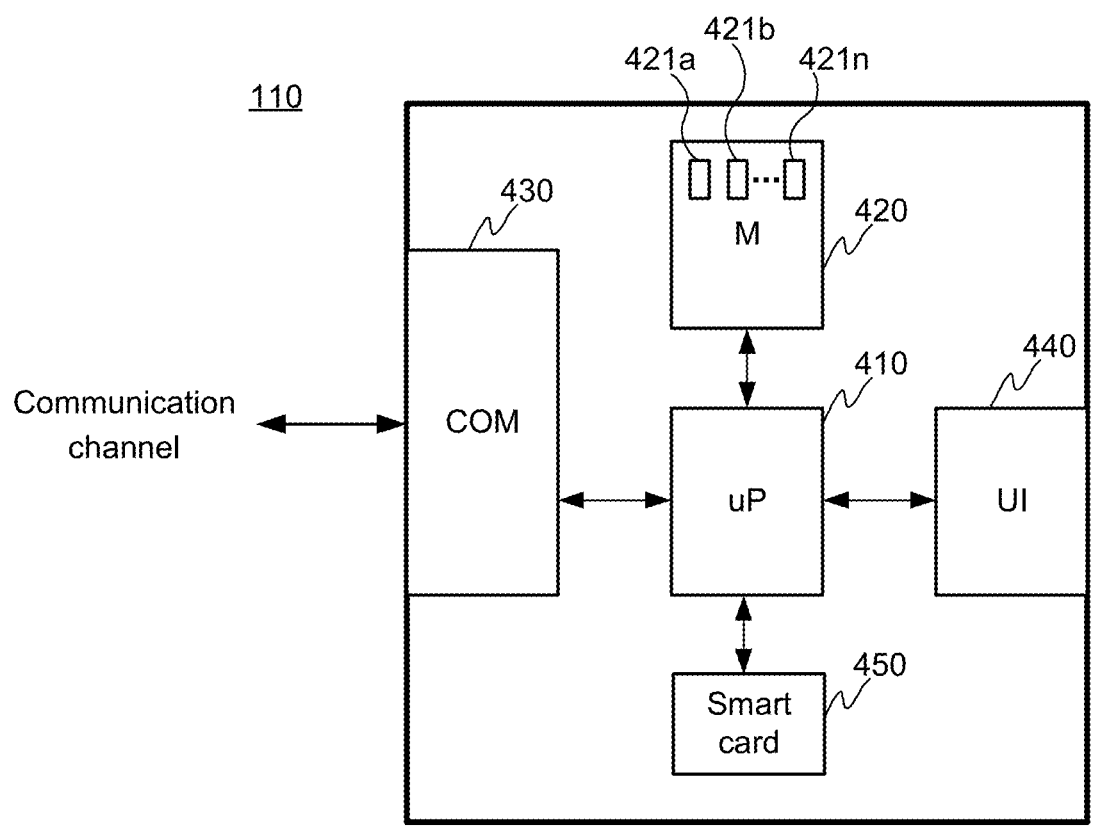
FIG. 4 illustrates schematically an example of user equipment of a subscriber according to an embodiment of the invention.

FIG. 4 schematically illustrates an example of the subscriber A 110, i.e. the user equipment of the subscriber A. The user equipment of the subscriber A 110 may comprise one or more processors 410, one or more memories 420 being volatile or non-volatile for storing portions of computer program code 421a-421n and any data values, a communication interface 430, one or more user interface units 440 and possibly a smart card 450, such as a subscriber identity module, implementing at least some operations for accessing a mobile communication network. The portions of computer program code 421a-421n may comprise instructions when executed by the at least one processor 410 enable functionalities of the communication application as described above when describing the present invention. The communication interface 430 may be configured to implement one or more communication technologies under control of the at least one processor 410 in order to enable communication over the specific communication framework and/or any communication network as described. The user equipment may comprise typical user interface units 440, such as touch screen, microphone, loudspeaker, keyboard, button and so on. As said, the user equipment of the subscriber A as depicted in FIG. 4 is a non-limiting example of an applicable device in which the present invention may be implemented to. The user equipment of the subscriber B may correspond to the one as schematically illustrated in FIG. 4. In case the subscriber B 120 does not support the specific communication framework such features are missing from the user equipment of the subscriber B.

Figure 5:
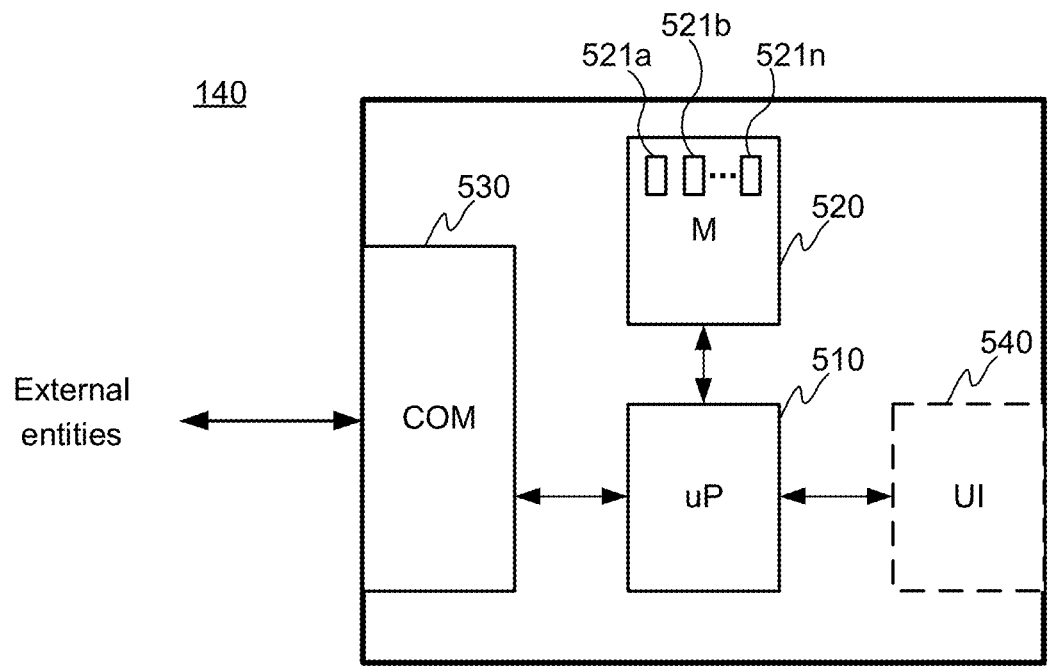
FIG. 5 illustrates schematically an example of a server according to an embodiment of the invention.

FIG. 5 discloses an example of a server 140 according to an embodiment of the invention. The server 140 may comprise one or more processors 510, one or more memories 520 being volatile or non-volatile for storing portions of computer program code 521*a*-521*n* and any data values, a communication interface 530 and possibly one or more user interface units 540. The mentioned elements are communicatively coupled to each other with e.g. an internal bus. The communication interface provides interface for communication with any external units needed in a certain implementation of the present invention as described, such as with one or more network nodes implementing a communication channel to the server or any user equipment. The communication interface may be based on one or more known communication technologies, either wired or wireless, in order to exchange pieces of information as described earlier.

The processor 510 of the server 140 is at least configured to implement at least some steps of the solution as described. The implementation of the method may be achieved by arranging the processor 510 to execute at least some portion of computer program code 521*a*-521*n* stored in the memory 520 causing the processor 510, and thus the server 140, to implement one or more method steps as described. The processor 510 is thus arranged to access the memory 520 and retrieve and store any information therefrom and thereto. Moreover, the processor 510 is configured to control the communication through the communication interface 530 with any external unit, such as with the sensors. The processor 510 may also be configured to control the output of information, i.e. data. The processor 510 may also be configured to control storing of received and delivered information. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention.

An example of the invention also relates to a non-transitory computer-readable storage medium, which stores at least portions of computer program code, wherein the portions of computer program code are computer-executable to implement the method steps of a user equipment of the subscriber A as described. In general, the computer-readable storage medium may include a storage medium or memory medium, such as magnetic or optical media e.g. disc, DVD/CD-ROM, volatile or non-volatile media, such as RAM. The computer program code may be written in any form of programming language, including compiled or interpreted languages, and the computer program may be deployed in any form, including as a stand-alone program or as a subroutine, element or other unit suitable for use in a computing environment. A computer program code may be deployed to be executed on one processor or on a plurality of processors arranged in the user equipment.

Some aspects of the present invention may also relate to a system for determining a communication channel for providing content data in a context of call setup. The system may comprise: a user equipment of a subscriber A 110, a user equipment of a subscriber B 120, a server 140, at least one communication network for communicatively coupling the server 140 to the user equipment of the subscriber A 110 and for communicatively coupling the server 140 to the user equipment of the subscriber B 120, and an infrastructure 150 for a specific communication framework. In the system the user equipment of the subscriber A 110 may be configured to perform: generate an inquiry with a communication application 320 to the infrastructure 150 for the specific communication framework, the inquiry comprising an indicator for determining a capability of the subscriber B 120 to support a specific communication framework; receive a response to the inquiry from the infrastructure 150, the response comprising an indication on the capability of the subscriber B 120 to support the specific communication framework; trigger, in response to a detection that the subscriber B 120 supports the predetermined communication framework, a transmission of the content data over the infrastructure 150 of the specific communication framework 340; and trigger, in response to a detection that the subscriber B 120 does not support the specific communication framework, a transmission of the content data to the subscriber B 120 via the server 140 over the communication network into which the subscriber B 120 is connected to 350.

Some elements or entities belonging to mobile communication network or in any other network necessary for implementing the invention are not disclosed in the appended figures or in the description in order to maintain the clarity of the description. For example, the mobile communication network consists of a core network part and radio access network part. The radio access part is not disclosed at all herein and as regards to core network only some parts are included. Generally speaking only those elements are disclosed which have relevance in implementing the invention as described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

What is claimed is:

1. A method for managing a call setup by determining a communication channel for providing content data in a context of the call setup from a subscriber A to a subscriber B, the method comprising:
generating an inquiry with a communication application and transmitting the inquiry for receipt at the subscriber B, the inquiry comprising an indicator for determining a capability of the subscriber B to support a specific communication framework;
receiving a response to the inquiry from the subscriber B, the response comprising an indication on the capability of the subscriber B to support the specific communication framework;

in response to a detection that the subscriber B supports the specific communication framework, triggering a transmission of the content data over the specific communication framework;

in response to a detection that the subscriber B does not support the specific communication framework, triggering a transmission of the content data to the subscriber B over a communication network into which the subscriber B is connected to; and initiating the call setup in response to a detection that the content data is delivered to the subscriber B.

2. The method of claim 1, wherein the specific communication framework is a Rich Communication Service (RCS) framework.

3. The method of claim 1, wherein the determination of the capability of the subscriber B is performed with a capability discovery procedure over Rich Communication Service (RCS) network infrastructure.

4. The method of claim 1, wherein, in response to the detection that the subscriber B does not support the specific communication framework, generating a signal to transmit the content data to a connection control unit serving the subscriber A, wherein an indication on a server implementing content data provision service is associated to the content data.

5. The method of claim 4, wherein the signal further comprises a contact address of the subscriber B.

6. The method of claim 1, wherein the call setup is initiated in response to a receipt of an acknowledgement indicating a successful transmission of the content data to the subscriber B.

7. A user equipment of a subscriber A for managing a call setup by determining a communication channel for providing content data in a context of call setup to a user equipment of a subscriber B, the user equipment of the subscriber A comprising:

at least one processor;

at least one memory including computer program code;

the at least one memory and the computer program code configured to, with the at least one processor, cause the user equipment of the subscriber A to:

generate an inquiry with a communication application and transmit the inquiry for receipt at the subscriber B, the inquiry comprising an indicator for determining a capability of the subscriber B to support a specific communication framework, receive a response to the inquiry from the subscriber B, the response comprising an indication on the capability of the subscriber B to support the specific communication framework, trigger, in response to a detection that the subscriber B supports the specific communication framework, a transmission of the content data over the specific communication framework, trigger, in response to a detection that the subscriber B does not support the specific communication framework, a transmission of the content data to the subscriber B over a communication network into which the subscriber B is connected to, and initiate the call setup in response to a detection that the content data is delivered to the subscriber B.

8. The user equipment of a subscriber A of claim 7, wherein the user equipment is configured to utilize a Rich Communication Service (RCS) framework as the specific communication framework.

9. The user equipment of a subscriber A of claim 7, wherein the user equipment is configured to determine the capability of the subscriber B with a capability discovery procedure over Rich Communication Service (RCS) network infrastructure.

10. The user equipment of a subscriber A of claim 7, wherein the user equipment of the subscriber A is configured to generate a signal for transmitting the content data to a connection control unit serving the subscriber A in response to the detection that the subscriber B does not support the specific communication framework, wherein an indication on a server implementing content data provision service is associated to the content data.

11. The user equipment of a subscriber A of claim 10, wherein the user equipment is configured to add a contact address of the subscriber B in the signal.

12. The user equipment of a subscriber A of claim 7, wherein the user equipment is configured to initiate the call setup in response to a receipt of an acknowledgement indicating a successful transmission of the content data to the subscriber B.

13. A computer program product comprising at least one non-transitory computer-readable storage medium having computer-executable program code instructions stored therein for performing the method of claim 1 when the computer program product is executed on a user equipment.

14. A system for managing a call setup by determining a communication channel for providing content data in a context of call setup, the system comprising:

a user equipment of a subscriber A;

a user equipment of a subscriber B;

a server;

at least one communication network for communicatively coupling the server to the user equipment of the subscriber A and for communicatively coupling the server to the user equipment of the subscriber B; and an infrastructure for a specific communication framework, wherein the user equipment of the subscriber A is configured to:

generate an inquiry with a communication application and transmit the inquiry to the infrastructure for the specific communication framework for receipt at the subscriber B, the inquiry comprising an indicator for determining a capability of the subscriber B to support a specific communication framework, receive a response to the inquiry from the subscriber B through the infrastructure, the response comprising an indication on the capability of the subscriber B to support the specific communication framework, trigger, in response to a detection that the subscriber B supports the specific communication framework, a transmission of the content data over the infrastructure of the specific communication framework, trigger, in response to a detection that the subscriber B does not support the specific communication framework, a transmission of the content data to the subscriber B via the server over the communication network into which the subscriber B is connected to, and initiate the call setup in response to a detection that the content data is delivered to the subscriber B.

* * * * *